(12) United States Patent
Joo et al.

(10) Patent No.: US 8,920,735 B2
(45) Date of Patent: Dec. 30, 2014

(54) SCC EQUIPPED WITH FOAM REMOVAL UNIT

(75) Inventors: Eun-Jung Joo, Daejeon (KR);
Dong-Kwon Lee, Daejeon (KR);
Dae-Young Shin, Daejeon (KR);
Jong-Ku Lee, Yuseong-gu (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/116,273

(22) PCT Filed: May 25, 2012

(86) PCT No.: PCT/KR2012/004177
§ 371 (c)(1),
(2), (4) Date: Nov. 7, 2013

(87) PCT Pub. No.: WO2012/165816
PCT Pub. Date: Dec. 6, 2012

(65) Prior Publication Data
US 2014/0088273 A1    Mar. 27, 2014

(30) Foreign Application Priority Data

May 27, 2011  (KR) .......... 10-2011-0050641
May 25, 2012  (KR) .......... 10-2012-0056073

(51) Int. Cl.
*B01J 19/18*     (2006.01)
*C08F 2/00*      (2006.01)
*C08F 210/00*    (2006.01)
*B01J 19/28*     (2006.01)
*B01D 19/02*     (2006.01)
*C08F 2/01*      (2006.01)
*B01J 19/00*     (2006.01)

(52) U.S. Cl.
CPC ................ *B01J 19/28* (2013.01); *B01D 19/02* (2013.01); *C08F 2/01* (2013.01); *B01J 19/006* (2013.01); *B01J 19/0066* (2013.01); *B01J 2219/0077* (2013.01); *B01J 2219/00777* (2013.01); *B01J 2219/00779* (2013.01)
USPC .............................. 422/136; 526/348; 526/71

(58) Field of Classification Search
CPC .... B01D 19/02; B01J 19/006; B01J 19/0066; B01J 19/28; B01J 2219/00777; B01J 2219/00779; B01J 2219/0077; C08F 2/01
USPC ..................................... 422/136; 526/71, 348
See application file for complete search history.

(56) References Cited

U.S. PATENT DOCUMENTS 4,007,022 A    2/1977  Schleicher et al.
4,053,006 A   10/1977  Tkac et al.
2006/0016731 A1  1/2006  Dal Maso

FOREIGN PATENT DOCUMENTS

CN    1978606 A    6/2007
DE    1083784 A    6/1960
(Continued)

OTHER PUBLICATIONS

Makarytchev, S.V. et al. "CFD analysis of spinning cone columns prediction of unsteady gas flow and pressure drop in a dry column." Chemical Engineering Journal; 2002; Elsevier Science B.V. pp. 1-11.

*Primary Examiner* — William Cheung
(74) *Attorney, Agent, or Firm* — McKenna Long & Aldridge LLP

(57) ABSTRACT

The present invention provides a SCC (Spinning Cone Column) equipped with a foam removal unit comprising: a housing having a rotation axis; a supply part of at least one reactant formed inside of the housing; at least two spinning cones that are installed so as to have a constant gradient from the upper part to the lower part to the rotation axis, move supplied reactants through the reactant supply part, and rotate around the rotation axis; a fixed cone that is fixed and formed on the inner side of the housing, and provides a pathway for sequentially moving reactant from a spinning cone at the upper part to a spinning cone at the lower part; a product collection part for collecting reactants moved through the spinning cone and the fixed cone; and a driving part for rotating the spinning cone, wherein a foam removal unit is installed on one side of the housing. The SCC according to the present invention solves the problems that foam is generated when separating material to be removed to decrease removal yield and lower stability of the product, and may improve removal yield and product stability because a foam removal unit is for removing generated foam is installed.

16 Claims, 1 Drawing Sheet

(56) References Cited

FOREIGN PATENT DOCUMENTS

| | | | |
|---|---|---|---|
| EP | 0191625 | * | 8/1986 |
| EP | 0191625 A2 | | 8/1986 |
| JP | 51-50991 | | 5/1976 |
| JP | 54-156265 A | | 12/1979 |
| JP | 61-274705 A | | 12/1986 |
| JP | 04-239030 | | 8/1992 |
| JP | 04-271828 | | 9/1992 |
| JP | 2000-264915 A | | 9/2000 |
| JP | 2001-172667 A | | 6/2001 |
| JP | 2005313100 | | 11/2005 |
| KR | 1020070115743 A | | 12/2007 |
| KR | 1020100021695 A | | 2/2010 |
| KR | 10-0961765 B1 | | 6/2010 |

* cited by examiner

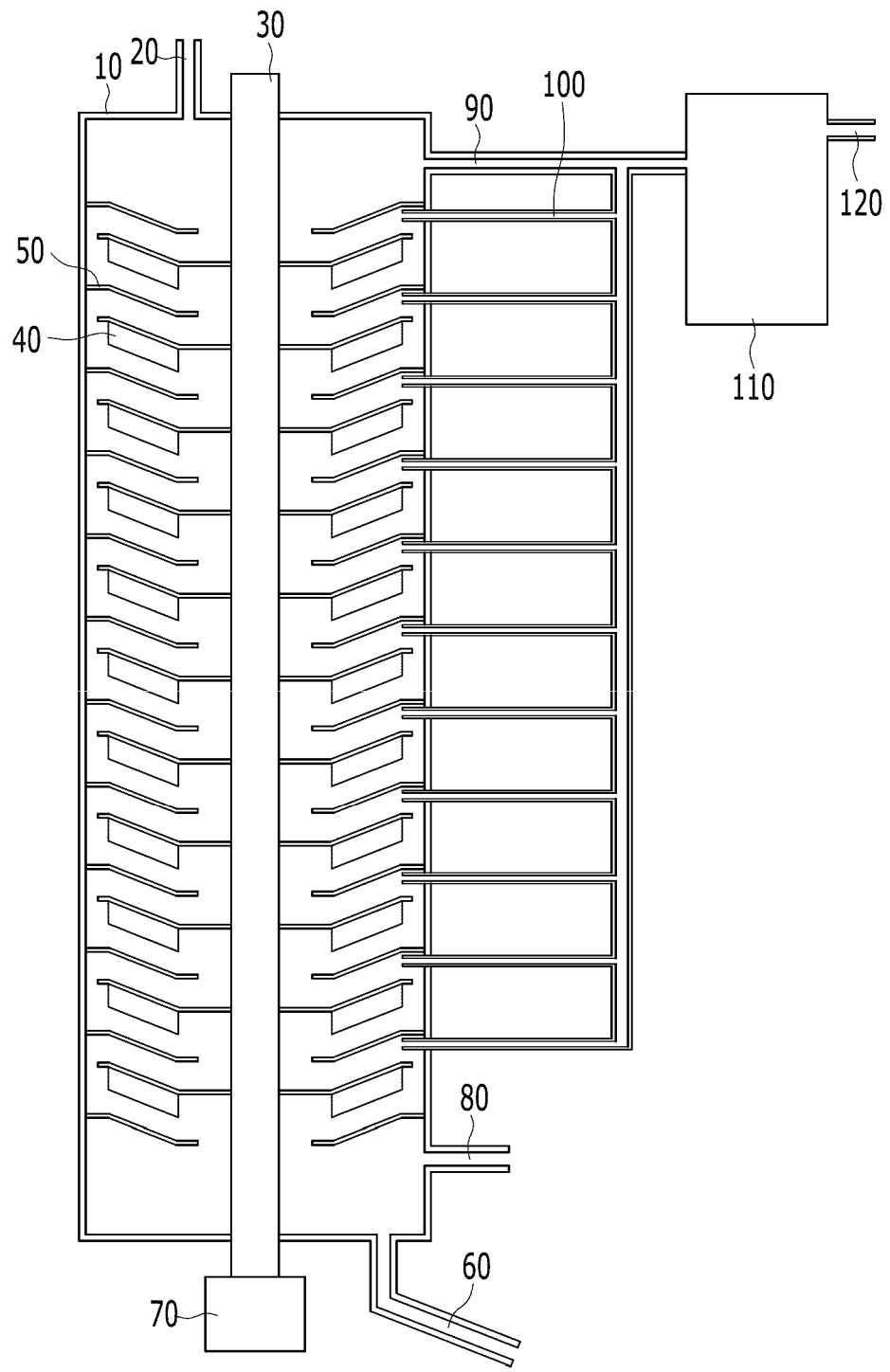

SCC EQUIPPED WITH FOAM REMOVAL UNIT

This application is a national stage application of International Application No. PCT/KR2012/004177, filed on May 25, 2012, which claims priority to and the benefit of Korean Patent Application Nos. 10-2011-0050641, filed May 27, 2011, and 10-2012-0056073, filed May 25, 2012, in the Korean Intellectual Property Office, the entire contents of which are incorporated herein by reference.

BACKGROUND OF THE INVENTION (a) Field of the Invention

The present invention relates to a SCC (spinning cone column) equipped with a foam removal unit, more particularly to a SCC equipped with a foam removal unit for removing foam generated in the SCC.

(b) Description of the Related Art

In general, to obtain a product through a chemical reaction, a reaction device is required. As the reaction device, a batch reactor where raw product is added to one reactor, and then, a reaction is conducted through agitation, and the like has been generally used. However, according to this method, sufficient reactions are not achieved for a reaction requiring rapid material transfer speed, thus generating a large amount of non-raw product, and if a catalyst is used, a catalyst separation process is required thus increasing a cost as a reactor has large-capacity.

Therefore, Korean Registered Patent No. 961,765 has suggested a spinning disc reactor, but it has a problem in that disc residence time of raw material is short because spinning discs are horizontally arranged, and thus, a spinning cone column (SCC) with improved residence time of raw materials by multistage installation of inclined discs, namely cones has been preferred. Meanwhile, the SCC may be applied for a gas-liquid contacting separation process. In case the SCC is applied for a gas-liquid contacting separation process, foam may be generated to lower stability of reactant and decrease yield in the process of removing material to be removed by contacting, and thus, there is a need to remove the foam.

SUMMARY OF THE INVENTION

It is an objected of the present invention to provide a SCC equipped with a foam removal unit, having improved removal yield and operability.

The present invention provides a SCC (Spinning Cone Column) comprising: a housing having a rotation axis; a supply part of at least one reactant formed inside of the housing; at least two spinning cones that are installed so as to have a constant gradient from the upper part to the lower part to the rotation axis, move reactants supplied through the reactant supply part, and rotate around the rotation axis; a fixed cone that is fixed and formed on the inner side of the housing, and provides a pathway for sequentially moving reactant from the spinning cone at the upper part to the spinning cone at the lower part; a product collection part for collecting reactants moved through the spinning cone and the fixed cone; and a driving part for rotating the spinning cone, wherein a foam removal unit is installed on one side of the housing.

Wherein, 2 to 40 spinning cones may be arranged from the upper part to the lower part around the rotation axis.

And, the SCC may be used for polymerization and etherification.

Wherein, the polymerization may be selected from the group consisting of liquid phase polymerization, gas phase polymerization, and free radical polymerization.

And, the surface of the spinning cone may be coated with a catalyst layer, an initiator or a mixture thereof.

And, the spinning cones may rotate around the same rotation axis at a rotation speed where G according to the following Equation 1 may become 1 to 100 times.

$$G = \frac{r\left(\frac{2\pi \times RPM}{60}\right)^2}{9.8} \qquad \text{[Equation 1]}$$

Wherein, G is a multiple of gravitational acceleration, r is radius (m) of the cone, and RPM is a rotation speed (times/min).

And, the spinning cone may be equipped with a heater and a temperature control means inside.

And, the SCC may be equipped with a heater and a temperature control means for progressing a reaction on the outer wall or inner wall of the housing, and the driving part may be a motor.

And, the SCC may further comprise a gas supply part and a remaining gas discharge part.

And, the foam removal unit may remove foam generated in the SCC.

And, the foam removal unit may comprise a vacuum part.

And, the foam removal unit may be connected with the inside of the housing by at least one collection tube.

And, each collection tube may be connected with the flow path of each stage consisting of one pair of the spinning cone and the fixed cone.

Moreover, the collection tube may be connected with the inside of the housing at the lower part of the fixed cone.

And, the reactant may be a polymer comprising volatile monomers, and the polymer comprising volatile monomers may be selected from the group consisting of PVC, SBR, NBR, ABS, and PBL latex.

According to another aspect of the invention, a method for removing unreacted monomers in polymer using the SCC is provided.

The SCC according to the present invention solves the problems that foam is generated when separating material to be removed to decrease removal yield and lower stability of the product, and may improve removal yield and product stability because a foam removal unit for removing generated foam is installed. And, to solve the problem that foam removal efficiency is lowered if foam removal is conducted only at the upper part of SCC, a collection tube connecting the foam removal unit and the inside of the housing is connected per flow path of each stage to remove foam at each stage, thus increasing foam removal efficiency and improving operability of SCC.

DETAILED DESCRIPTION OF THE EMBODIMENTS

The present invention may have many examples and various modifications may be made, and specific examples will be illustrated in drawings and explained in detail. However, it should be understood that the present invention is not limited to specific examples, and includes all modifications, equivalents or substitutions within the scope and technical scope of the invention. In the explanations of the invention, detailed explanations of related known technologies may be omitted if it is judged to obscure the subject matter of the invention.

DESCRIPTION OF THE DRAWINGS

The present invention provides a SCC comprising: a housing (10) having a rotation axis (30); a supply part (20) of at least one reactant formed inside of the housing; at least two spinning cones (40) that are installed so as to have a constant gradient to the rotation axis from the upper part to the lower part, move reactants supplied through the reactant supply part, and rotate around the rotation axis (30); a fixed cone (50) that is fixed and formed on the inner side of the housing, and provides a pathway for sequentially moving reactant from a spinning cone at the upper part to a spinning cone at the lower part; a product collection part (60) for collecting reactants moved through the spinning cone and the fixed cone; and a driving part (70) for rotating the spinning cone, wherein a foam removal unit (110) is installed on one side of the housing. FIG. 1 shows the structure of SCC equipped with a foam removal unit according to one embodiment of the invention.

The SCC according to the present invention may improve removal yield of material to be subject and product stability, because it is equipped with a foam removal unit capable of removing generated foam.

According to one embodiment of the invention, at least two spinning cones (40) may be installed so as to have a constant gradient from the upper part to the lower part along the same rotation axis (30). When the rotation axis rotates, the spinning cones simultaneously rotate to spread supplied reactant on the spinning cone thereby broadening the surface area to facilitate the removal of material to be removed by contact with gas, and the like. Wherein, at least two, preferably 2 to 40, more preferably 2 to 23 spinning cones may be arranged from the upper part to the lower part around the rotation axis.

And, the fixed cone (50) may provide a pathway for sequentially moving reactants from a spinning cone at the upper part to another spinning cone at the lower part. The fixed cone is fixed and formed on the inner side of the housing (10), and thus, it does not rotate when the rotation axis rotates.

Reactants are supplied to a reactant supply part (20) formed inside of the housing (10), and move to the lower part through the spinning cone (40) and the fixed cone (50) by the rotation of the rotation axis (30). During the movement, material to be removed is removed, and the reactant free of material to be removed moves to a product collection part (60).

Meanwhile, the SCC may be used for polymerization and etherification. Wherein, the reaction using the SCC according to the present invention may include a gas-liquid reaction, and a liquid-liquid reaction, preferably polymerization and etherification.

The polymerization may include liquid phase polymerization, gas phase polymerization, or free radical polymerization, but is not limited thereof. For example, for etherification, reactants including at least one olefin and alcohol are introduced into a spinning cone unit of a first stage through the reactant supply part, and each spinning cone is rotated around the same rotation axis using a motor to progress a reaction, thereby preparing ether or ether mixture. Wherein, the surface of the spinning cone may be coated with zeolite catalyst. And, the olefin may be C2-4 alkene or alkyne, and the alcohol may be C1-8 lower alcohol. And, in case free radical polymerization is progressed, a lamp for providing UV light source may be further installed. And, the surface of the spinning cone may be coated with a catalyst layer, an initiator or a mixture thereof. The catalyst may include common metal catalysts or metal supported catalysts for polymerization, and the kind is not specifically limited. And, as the initiator, polymerization initiators commonly used for polymerization may be used. And, the thickness of the coating is not specifically limited as long as it may progress a reaction.

And, the spinning cones may rotate around the same rotation axis at a rotation speed where G according to the following Equation 1 may become 1 to 100 times.

$$G = \frac{r\left(\frac{2\pi \times RPM}{60}\right)^2}{9.8} \quad \text{[Equation 1]}$$

Wherein, G is a multiple of gravitational acceleration, r is radius (m) of the cone, and RPM is a rotation speed (times/min).

And, the spinning cone may be equipped with a heater and a temperature control means inside, the SCC may be equipped with a heater and a temperature control means for progressing reactions on the outer wall or inner wall of the housing, and the driving part (70) may be a motor.

And, in case a gas-liquid reaction is progressed, the SCC may further comprise a gas supply part (80) and a remaining gas discharge part (90).

Namely, a gas supply part capable of supplying gas to the inside of the housing may be selectively installed on the outer wall of the housing. In this case, it is preferable to install an inlet immediately under the raised spot of the housing inner wall and introduce gas. And, the remaining gas produced after reaction may be discharged through a remaining gas discharge part separately installed at the upper part of the housing.

Furthermore, the housing (10) may be made of stainless steel, but is not limited thereto.

Meanwhile, foam generated in the SCC may block a gas flow path to decrease material transfer between gas-liquid and lower operation stability.

Thus, according to one embodiment of the invention, the SCC is equipped with a foam removal unit functioning for removing the foam.

The foam removal unit (110) capable of removing foam generated in the SCC may comprise a vacuum part (120). By the vacuum part, foam generated in the SCC may be removed using pressure difference between the inside of the foam removal unit and the inside of the housing.

Furthermore, the foam removal unit may be connected with the inside of the housing by at least one collection tube (100). Wherein, foam may be collected through the collection tube. The collection tube may be installed on one side of the housing, and at least one collection tube for connecting the foam removal unit and the inside of the housing may be equipped at the upper part, middle part, or lower part.

And, when a pair of a spinning cone and a fixed cone is considered as a stage, the collection tube (100) of the foam removal unit may be connected to the side flow path of the space between the spinning cone and the fixed cone of each stage. Wherein, a flow path refers to a pathway where gas and the like existing between a spinning cone and a fixed cone in a stage consisting of one pair of a spinning cone and a fixed cone may flow. The collection tube may connect at least one flow path of each stage with the foam removal unit.

And, the collection tube may be respectively connected per a flow path of each stage consisting of a spinning cone and a fixed cone. If a collection tube connecting the foam removal unit and the inside of the housing is connected per a flow path of each stage, foam generated at each stage may be removed, thus increasing foam removal efficiency.

Furthermore, the collection tube may be connected with the inside of the housing at the lower part of the fixed cone. Namely, the collection tube may be located close to the lower part of each fixed cone, and under the collection tube, a spinning cone may be located. Specifically, each collection tube may be located between the lower part of a fixed cone and the upper part of a spinning cone, thus selectively removing only foams without disturbing flow of liquid.

Meanwhile, according to one embodiment of the invention, a distance between the stages is not specifically limited. A distance between the stages may be fixed, a distance between the stages close to the upper part may be wider than a distance between the stages close to the lower part, or a distance between the stages close to the lower part may be wider than a distance between the stages close to the upper part.

According to one embodiment of the invention, the reactant is not specifically limited as long as it is a polymer including volatile monomers, but preferably, it may be selected from the group consisting of PVC, SBR, NBR, ABS, and PBL latex.

If polymer including volatile monomers is supplied through the reactant supply part of the SCC of the present invention, it passes through the spinning cone and the fixed cone by the rotation of the rotation axis, and for example, VCM (vinyl chloride monomer) in PVC latex, or SM (styrene monomer) in SBR latex is discharged to a discharge part as remaining monomers, namely, material to be removed. Wherein, foam generated when the PVC latex or SBR latex reacts may be collected in a foam removal unit through the collection tube of the foam removal unit and removed.

Thus, the SCC according to the present invention may improve removal yield of material to be removed and product stability because a foam removal unit capable of removing generated foam is installed, and to solve problems that foam removal efficiency is lowered if foam removal is conducted only at the upper part of SCC, a collection tube connecting the foam removal unit with the inside of the housing is respectively connected per flow path of each stage to remove foam at each stage, thus increasing foam removal efficiency and improving SCC operability.

Although specific embodiments of the present invention have been described in detail, it would be obvious to one of ordinary knowledge in the art that these are no more than preferable examples, and the scope of the invention is not limited thereto. Thus, the scope of the invention is substantially defined by appended claims and equivalents thereof.

What is claimed is:

1. A SCC (Spinning Cone Column) equipped with a foam removal unit comprising
    a housing having a rotation axis;
    a supply part of at least one reactant formed inside of the housing;
    at least two spinning cones that are installed so as to have a constant gradient from the upper part to the lower part to the rotation axis, move reactants supplied through the reactant supply part, and rotate around the rotation axis;
    a fixed cone that is fixed and formed on the inner side of the housing, and provides a pathway for sequentially moving reactant from a spinning cone at the upper part to a spinning cone at the lower part;
    a product collection part for collecting reactants moved through the spinning cone and the fixed cone; and
    a driving part for rotating the spinning cone,
    wherein a foam removal unit is installed on one side of the housing.

2. The SCC according to claim 1, wherein 2 to 40 spinning cones are arranged from the upper part to the lower part around the rotation axis.

3. The SCC according to claim 1, wherein the SCC is used for polymerization and etherification.

4. The SCC according to claim 1, wherein the surface of the spinning cone is coated with a catalyst layer, an initiator or a mixture thereof.

5. The SCC according to claim 1, wherein the spinning cone rotates around the same rotation axis at a rotation speed where G according to the following Equation 1 becomes 1 to 100 times $$G = \frac{r\left(\frac{2\pi \times RPM}{60}\right)^2}{9.8} \quad \text{[Equation 1]}$$

wherein, G is a multiple of gravitational acceleration, r is radius(m) of the cone, and RPM is a rotation speed (times/min).

6. The SCC according to claim 1, wherein the spinning cone is equipped with a heater and a temperature control means inside.

7. The SCC according to claim 1, wherein the SCC is equipped with a heater and a temperature control means for progressing a reaction on the outer wall or inner wall of the housing.

8. The SCC according to claim 1, further comprising a gas supply part and a remaining gas discharge part.

9. The SCC according to claim 1, wherein the foam removal unit removes foam generated in the SCC.

10. The SCC according to claim 1, wherein the foam removal unit further comprises a vacuum part.

11. The SCC according to claim 1, wherein the foam removal unit is connected with the inside of the housing by at least one collection tube.

12. The SCC according to claim 11, wherein each collection tube is connected with the flow path of each stage consisting of one pair of the spinning cone and the fixed cone.

13. The SCC according to claim 11, wherein the collection tube is connected with the inside of the housing at the lower part of the fixed cone.

14. The SCC according to claim 1, wherein the reactant is polymer including volatile monomers.

15. The SCC according to claim 1, wherein the SCC is for removal of unreacted monomers in polymer.

16. A method for removing unreacted monomers in polymer using the SCC according to claim 1.

* * * * *